(12) United States Patent
Kendrick

(10) Patent No.: US 7,542,915 B2
(45) Date of Patent: Jun. 2, 2009

(54) SYSTEM OF CHARGING FOR AUTOMOBILE INSURANCE

(75) Inventor: Rodney B. Kendrick, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 952 days.

(21) Appl. No.: 10/674,929

(22) Filed: Sep. 30, 2003

(65) Prior Publication Data

US 2005/0071202 A1    Mar. 31, 2005

(51) Int. Cl.
*G06Q 40/00*    (2006.01)
(52) U.S. Cl. ......................................................... 705/4
(58) Field of Classification Search ...................... 705/4
See application file for complete search history.

(56) References Cited

U.S. PATENT DOCUMENTS

| | | | |
|---|---|---|---|
| 4,667,336 A | 5/1987 | Best | |
| 4,843,578 A | 6/1989 | Wade | |
| 5,499,182 A | 3/1996 | Ousborne | |
| 5,797,134 A * | 8/1998 | McMillan et al. | 705/400 |
| 6,052,466 A * | 4/2000 | Wright | 380/262 |
| 6,064,970 A | 5/2000 | McMillan et al. | |
| 6,204,757 B1 | 3/2001 | Evans et al. | |
| 2002/0128882 A1 * | 9/2002 | Nakagawa et al. | 705/4 |
| 2002/0178033 A1 | 11/2002 | Yoshioka et al. | |

OTHER PUBLICATIONS

Delio, Michelle, "Rent-A-Car Motto: Speed Bills", www.wired.com/news/print/0,1294,45163,00.html, (Jul. 12, 2001) pp. 1-4.
ESA: Pay-as-you-go monitoring just around the corner, http://www.spaceref.com/news/viewpr.html?pid=12512, (Sep. 9, 2003).

* cited by examiner

*Primary Examiner*—Gerald J. O'Connor
*Assistant Examiner*—Sheetal R Rangrej
(74) *Attorney, Agent, or Firm*—Harness, Dickey & Pierce, P.L.C.

(57) ABSTRACT

A method and apparatus for determining an incremental cost of insurance for the operation of a motor vehicle and billing the same to an operator of the vehicle. The system uses an internal system for determining one or more operational factors associated with the vehicle, such as its geographic location, speed, acceleration, etc, in at least near real time, and recording the information in a database. From this information incremental insurance cost information is determined relating to the cost of insuring the vehicle for a predetermined time during, for example one day. The insurance cost information is transmitted to a contracting company, which may comprise an underwriting company responsible for providing the insurance coverage for the vehicle. The invention makes it possible for an operator to better gauge how driving habits and/or usage of the vehicle affect the cost of the insurance, as well as providing insurance companies with near real time information from which even more accurate determinations of risk can be made, and insurance costs to the operator adjusted accordingly.

19 Claims, 2 Drawing Sheets

SYSTEM OF CHARGING FOR AUTOMOBILE INSURANCE

FIELD OF THE INVENTION

The present invention relates to a method of charging for vehicle insurance, and more particularly to a method of using location information to charge for vehicle insurance but restricting access to the location information to add to the privacy of the vehicle owner.

BACKGROUND OF THE INVENTION

Most drivers, if not all, have insurance for their motor vehicle(s) (i.e., cars, trucks, motorcycles, etc.). Many states now mandate that vehicle insurance be purchased and maintained by the vehicle owner. Leasing companies also often require that insurance be maintained on a leased vehicle.

Insurance companies traditionally obtain background information from the driver and about the driver's vehicle through interviews and applications. The background information is compared to information databases that may include actuarial statistics. From the comparison, a total cost is determined and the driver is charged for the vehicle insurance accordingly. It should be appreciated that unless additional information is reported to the insurance company, for example, accidents or other driver information, no further data may be used to revise the cost of the automobile insurance. Because the insurance company uses little to no new data, for revising the cost of a driver's insurance policy, the cost of the policy may become incommensurate with the actual risk presented by a given driver/vehicle combination, and the cost to underwrite that risk.

The conventional way of charging for vehicle insurance, as noted above, presents very little opportunity for the driver to change his or her driving habits to otherwise affect the cost of the vehicle insurance. While avoiding accidents remains a traditional way to keep the cost of insurance low, accidents are only one input in determining the cost of the vehicle insurance. Notwithstanding, some drivers' activity or lack thereof may not be adequately accounted for when establishing the cost for the vehicle insurance policy. Some aforementioned driver activity may include taking advantage of city mass transportation systems, and otherwise leaving the vehicle parked or garaged for the majority of the day. Other activity may include driving through high risk areas where accidents are more likely to occur in given intersections or where theft may be more prevalent. As a consequence, one driver may be undercharged while another driver may be overcharged for the risk experienced by the driver/vehicle and the cost to underwrite that risk. It is desirable to provide a method of charging for automobile insurance that is more accurate and more efficient than the conventional methods. It is additionally desirable to provide a method for charging for vehicle insurance that takes into account how, when, and where the vehicle is driven to better gauge the actual risk presented to a driver/vehicle and the cost to underwrite that risk.

Knowledge of the exact whereabouts of the vehicle at a given time allows the insurance company to derive more accurately the costs based on that location information. Consumers, however, are wary of transmitting the exact location of their vehicle on a real-time basis to, among other things, an insurance company. It is desirable to obtain location information to better determine the cost of the vehicle insurance, but otherwise restrict access to the location information and add to the privacy of the operator of the vehicle.

SUMMARY OF THE INVENTION

The present invention is directed to a system and method for providing real time information concerning various factors on the operation and/or location of a motor vehicle, and using the information to determine an incremental vehicle insurance cost. The incremental vehicle insurance cost represents that cost for vehicle insurance for a given time increment, for example, a single day. This information is transmitted by the system to a remotely located contracting company involved with providing insurance to the vehicle operator.

In one preferred form, the system includes a computation device that is located on the operator's vehicle. The computation device may monitor one or more factors relating to the operation of the vehicle, such as the vehicle's real time geographic location, its speed, acceleration, deceleration, length of time within certain predefined geographic areas, etc. This information is used along with a suitable cost database and a cost calculation system to generate incremental vehicle insurance cost information that is transmitted to the remote contracting company. In another preferred form, only the vehicle operational information is transmitted to the remotely located contracting company and the incremental vehicle insurance cost information is determined by the contracting company or a different entity.

In a preferred implementation the vehicle's operational information is encrypted and stored in a suitable database. In yet another implementation the encrypted information is only available to the vehicle operation and/or the contracting company if a plurality of passwords are employed, one being known only to the vehicle operator and one being known only to the contracting company. This facilitates access to the encrypted information only when both the operator and the contracting company agree that review of such information is needed, such as in the event of a billing dispute.

The present invention makes it possible to provide an operator of a motor vehicle with near real time incremental insurance cost information which can help assist the operator in modifying driving habits, if needed, to potentially reduce the overall insurance cost associated with operating the vehicle. The invention also enables insurance companies to even more accurately gauge the risk associated with the operation of vehicles that they are insuring so that insurance premiums assessed to operators of motor vehicles can even more accurately reflect the level of risk associated with the operation of each vehicle.

BRIEF DESCRIPTION OF THE DRAWINGS

The present invention will become more fully understood from the detailed description, the appended claims, and the accompanying drawings, wherein:

DETAILED DESCRIPTION OF THE PRESENT INVENTION

The following description of the present invention is merely exemplary in nature and is in no way intended to limit the invention, its application, or uses.

Figure 1:
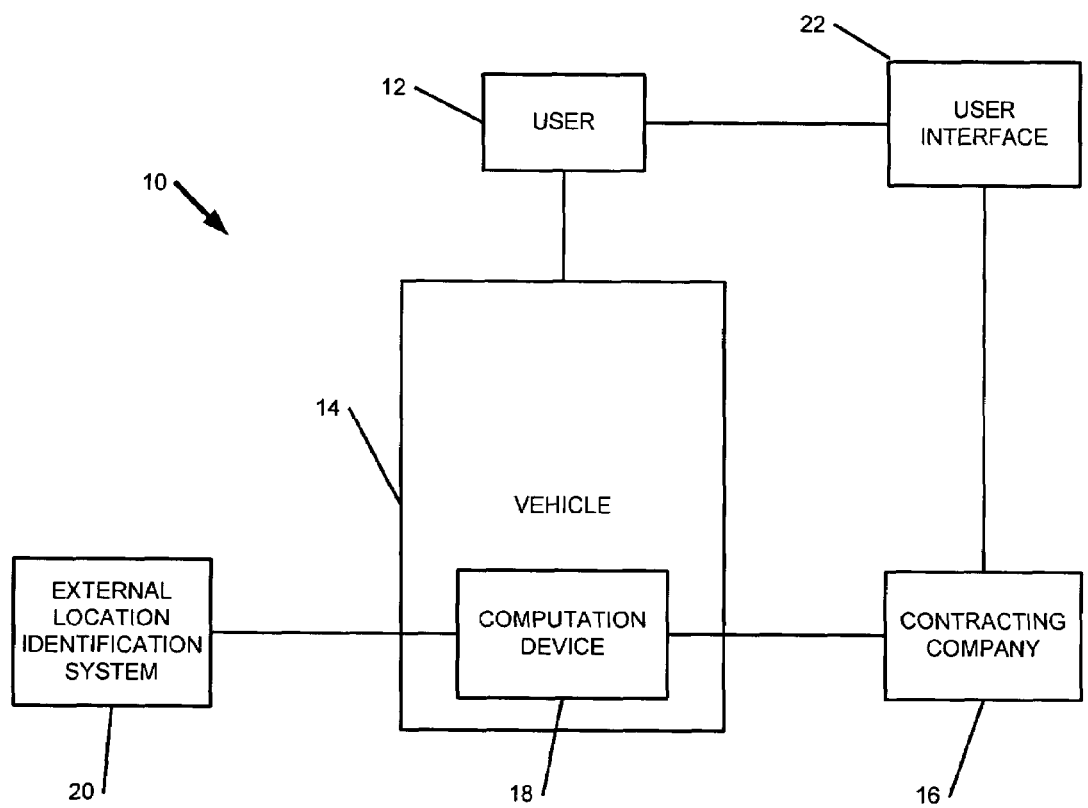
FIG. 1 is a simplified block diagram representing the components of the insurance cost computation system constructed in accordance with the principles of the present invention.

With reference to FIG. 1, an insurance cost computation system is generally indicated by reference numeral 10. A user 12 operates a vehicle 14 that is either required to be covered by insurance, or for which the user has chosen to purchase insurance coverage. The user 12 contacts a contracting company 16 for example, an automobile insurance company, and elects a pay as you go insurance plan. It should be appreciated that there are many ways to implement the pay as you go insurance plan; however, the present invention, in one preferred form, involves installation of a computation device 18 in the vehicle 14. The computation device 18 may establish a communication link with the contracting company 16, and with an external location identification system 20. The computation device 18 monitors the real time location of the vehicle 14 and determines a cost for the vehicle insurance. This cost is transmitted to the contracting company 16 for later billing to the user 12.

The computation device 18 may transmit cost information to the contracting company 16 for later billing to the user 12 at various time increments. In one preferred implementation, the computation device 18 contacts the contracting company 16 on a daily basis to transmit cost information. A user interface 22 is available for the user 12 to contact the contracting company 16 and monitor the cost of the vehicle insurance whenever needed. The computation device 18 only transmits the cost information to the contracting company 16; as such, the user interface 22 will only display the cost of the automobile insurance for the given time increment. As noted earlier, if the given time increment is one day, the user 12 may retrieve from the user interface 22 the daily cost of the automobile insurance.

The computation device 18 may also establish communication with the external location identification system 20. The external location identification system 20 transmits information to the computation device 18 from which the computation device 18 may determine the location of the vehicle 14. The location of the vehicle 14, among other factors, is used to compute the cost of the automobile insurance for the given time increment.

Figure 2:
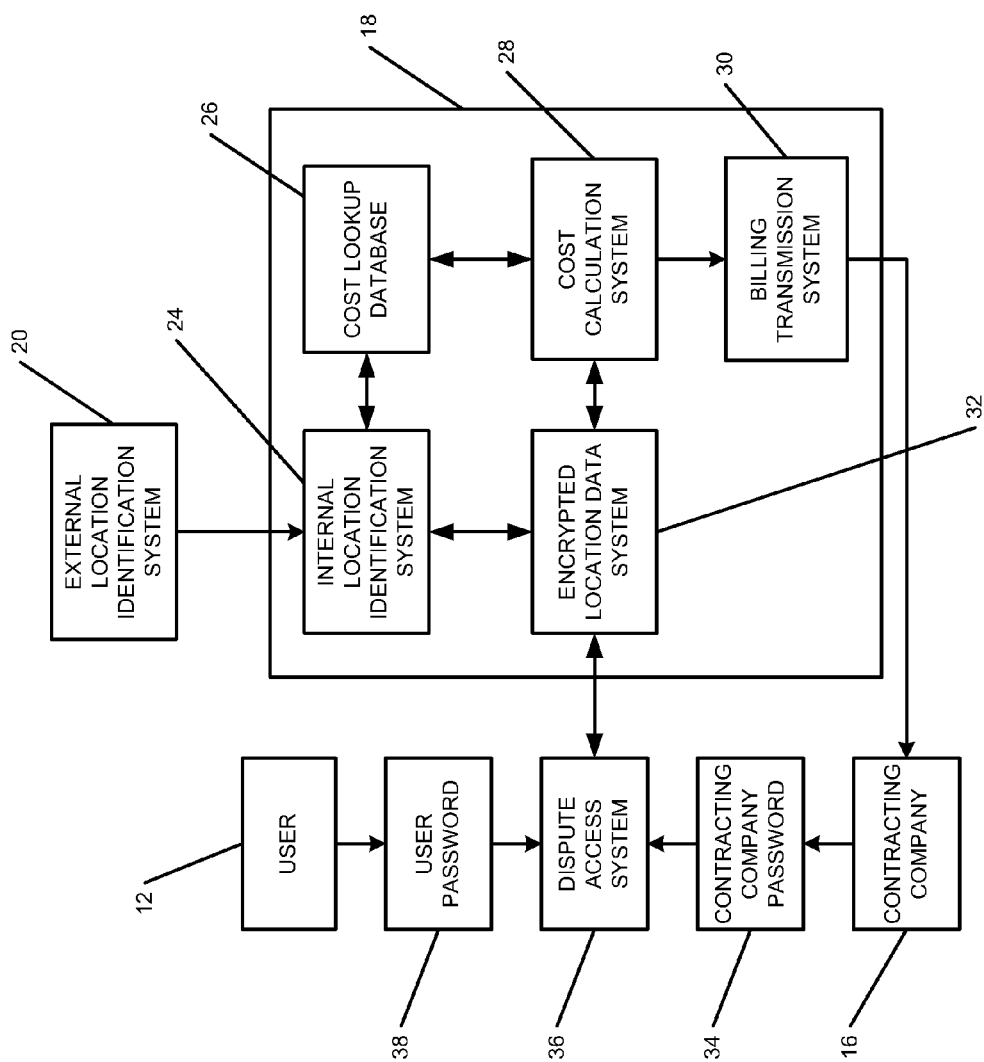
FIG. 2 is a block diagram representing the components of the computation device of FIG. 1 showing inputs and outputs of the computation device.

With reference to FIG. 2, a more detailed view of the computation device 18 is shown along with the various systems that may communicate with the computation device 18. The computation device 18 includes an internal location identification system 24 that receives information from the external location identification system 20 via electromagnetic wave signals. In one preferred implementation, the external location identification system 20 comprises a plurality of global positioning system satellites. The internal location identification system 24 may also comprise a modified global positioning system receiver. The internal location identification system 24 determines the geographical location of the car and correlates that information with a cost lookup database 26. The location information is then encrypted and stored in an encrypted location data system 32. Cost information is tallied by a cost calculation system 28, and then sent to a billing transmission system 30 for eventual transmission of the cost information or a cost increment to the contracting company 16.

The internal location identification system 24 may provide many features to the computation device 18. For example, the internal location identification system 24 may provide location information and vehicle information. The location information preferably includes one or more pieces of information including a geographical location of the vehicle, a duration of time the vehicle is located within a given geographical location, a vehicle speed, an applicable speed limit, or combinations and derivations thereof. The vehicle information may also include a vehicle acceleration rate, a vehicle deceleration rate, a vehicle maintenance status, an engine speed, a brake force, a vehicle payload, or combinations and derivations thereof.

The location information and the vehicle information are then evaluated relative to the cost lookup database 26. The cost lookup database 26 may include actuarial statistics and may also include additional information to make the determination of risk for the contracting company 16 more accurate. The additional information in the cost lookup database 26 may include crime statistics, accident statistics, traffic congestion information, weather information, or combinations and derivations thereof. In one preferred form, the information contained within the cost lookup database 26 is resident within the computation device 18. Additionally, the information contained within the cost lookup database 26 may be updated by the contracting company 16.

The cost increment is determined by evaluating the location information and the vehicle information along with the cost lookup database 26. The location information and the vehicle information may take the form of a single variable or a plurality of variables with certain values determined by the vehicle and where the vehicle travels. The plurality of variables are ultimately correlated with the cost lookup database 26. In addition, the plurality of variables may comprise absolute mileage, hours driven, multipliers associated with geographic indicators, vehicle indicators, or combinations and derivations thereof.

The plurality of variables are then associated with the cost lookup database 26, which may comprise multipliers based on mileage or duration, fixed costs associated with the plurality of variables, or combinations or derivations thereof. After the plurality of variables from the location information and the vehicle information are correlated with the cost lookup database 26, a cost increment is produced.

The cost increment is sent to the cost calculation system 28. The cost increment, therefore, is defined as an amount of money or, put another way, contains only monetary information. More notably, the cost increment excludes any of the location information or the vehicle information. It should be appreciated that the cost increment need only be derived from location information or vehicle information. As such, the computation device 18 can accommodate one or more inputs into the determination of the cost increment.

The location information and the vehicle information, which are used to derive the cost increment, are saved in the encrypted location data system 32. The cost increment, being only a dollar amount, is passed to the billing transmission system 30, which sends the cost increment to the contracting company 16. The billing transmission system 30 may be configured in many different ways to transmit the cost increment to the contracting company 16. One such configuration is a cellular transmission system using cell phone service. Other exemplary configurations include contacting the contracting company 16 using various forms of electromagnetic wave communication, a phone connection, an internet connection, and combinations thereof.

It will be appreciated that the billing transmission system 30 may contact the contracting company at various times. In one preferred form the billing transmission system 30 contacts the contracting company 16 to transmit the cost increment on a daily basis. The billing transmission system 30, however, may contact the contracting company 16 at any time or simply store the billing information until contact is possible.

As noted earlier, no location information is transmitted to the contracting company 16 on a regular basis. Situations may arise, however, where review of the location information is necessary, such as for billing disputes. Access to the encrypted location data system 32 and subsequent decryption is possible through a dispute access system 36. It should be appreciated that the dispute access system 36 may be configured in many different ways. Preferably, however, access to the dispute access system 36 only provides access to unencrypted location information when a user password 38 from the user 12 is combined with a contracting company password 34 from the contracting company 16. As such, the only way to decrypt or gain access to the stored location information in the encrypted location data system 32 is with access by a passkey containing at least both passwords 38 and 34. It will be appreciated that both passwords 38 and 34 must be used to access the dispute access system 36.

It will be appreciated that access to the dispute access system 36 is not unlike conventional safe deposit boxes found at banking institutions. Traditional safe deposit boxes require key access with two keys simultaneously. The first key is held by the safety deposit box holder usually a customer of the bank. The second key is held by the bank. Only when the bank confirms the identity of the customer are both keys used simultaneously to open the safety deposit box. It will be appreciated that the dispute access system 36 may be configured in many different ways, but it is envisioned that the dual password system or dual passkey system may have similarities to systems of accessing a conventional safety deposit vault.

The dispute access system 36 may be further configured to allow the user 12 to access encrypted location information from the encrypted location data system 32. The user interface 22 may be configured to permit the user 12 to access location information to monitor use and cost associated with driving the vehicle 14. The dispute access system 36 may also be configured to allow access only to unencrypted location information and only in the event of a dispute where access is obtained by the user 12 and the contracting company 16 simultaneously to reveal the unencrypted location information. The dispute access system 36 may be additionally configured to erase the location information every two months or at any suitable, periodic time increment unless established otherwise, such as in the event of a billing dispute. It should be appreciated that only the user 12 has access to the unencrypted location information. The user 12 may also grant access to the contracting company 16 by combining the user password 38 with the contracting company password 34, thus utilizing the two password or passkey system.

Because the user 12 is able to access the cost increment or cost information through the user interface 22, the user is able to alter use and activity of the vehicle 14 to possibly reduce the cost of the vehicle insurance. The ability to access the cost of the vehicle insurance on a daily basis empowers the vehicle owner to alter driving habits accordingly, which may result in a savings due to changes in vehicle insurance cost. Furthermore, the contracting company 16 receives much more data about vehicle use over time. The additional data received from the insurance cost computation system 10 may be used to streamline and improve the efficiency of the automobile insurance business to the betterment of the automobile insurance customers as well as to stockholders of insurance companies.

It will be appreciated that the computation device 18 has a single input which may take the form of information from the external location identification system 20, and a single output which is cost information transmitted from the billing transmission system 30 to the contracting company 16. Only when the user 12 and the contracting company 16 utilize the dispute access system 36 with both passwords 38 and 34 is additional communication with the computation device 18 realized.

As noted above, access to the computation device through the dispute access system 36 is the only way to obtain unencrypted location information from the computation device 18. Because only cost information is transmitted from computation device 18, privacy concerns surrounding real time location of the vehicle are accommodated as the computation device 18 only transmits a dollar amount.

In an alternative implementation, the insurance cost computation system 10 may broadcast raw location information and vehicle information to the contracting company 16, for subsequent cost calculation at the contracting company 16. Further, the plurality of variables derived from the location information and the vehicle information may be transmitted to the contracting company 16. The cost increment could then be determined at the contracting company 16. Notwithstanding the various alternative implementations of the present invention, the preferred implementation only transmits a cost increment to the contracting company 16 and retains and encrypts privacy sensitive information.

Also, while the computation device 18 is depicted in FIG. 2 as a single unit that can be installed, replaced, or swapped accordingly, it will be appreciated that the computation device 18 may be what is conventionally known as a line replaceable unit (LRU). Configuration as an LRU enables the computation device to be quickly and easily removed from a vehicle should the need arise.

While various embodiments of the present invention have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A computer-implemented method of calculating automobile insurance for a vehicle of a customer of a contracting company, the computer-implemented method comprising:

acquiring location information of the vehicle with a location system on the vehicle;

acquiring vehicle performance information from a computation device on a vehicle;

deriving a first cost increment with said computation device by evaluating at least said location information, said vehicle performance information and a pricing database, wherein said deriving of said first cost increment is performed on the vehicle;

connecting a billing transmission system on the vehicle with the contracting company;

transmitting said first cost increment with said billing transmission system to the contracting company, wherein said first cost increment is devoid of said location information and said vehicle performance information;

restricting access to said location information and said vehicle performance information with said billing transmission system by at least encrypting said information and said vehicle performance information;

accessing said location information and said vehicle performance information with said billing transmission system by at least decrypting said location information and said vehicle performance information with an access key, wherein said access key consists of a first passkey retained by the customer and a second passkey retained by a contracting company;

providing access with a computing device for the customer outside of the vehicle to said first cost increment prior to the contracting company billing the customer, wherein said providing access to said first cost increment is adapted to permit the customer to alter driving habits to adjust a second cost increment transmitting said second cost increment with said billing transmission system to the contracting company, wherein said second cost increment is devoid of location information and said vehicle performance information; and determining billing for the customer from the contracting company based on at least said first and said second cost increments from said billing transmission system.

2. The computer-implemented method of calculating automobile insurance of claim 1, wherein said location information includes at least one of a geographical location of the vehicle, a duration of time the vehicle is located at said geographical location, a vehicle speed, an applicable speed limit, and combinations thereof.

3. The computer-implemented method of calculating automobile insurance of claim 1, wherein said vehicle performance information includes at least one of a vehicle speed, a vehicle acceleration rate, a vehicle deceleration rate, a vehicle maintenance status, an engine speed, a brake force, a vehicle payload, and combination thereof.

4. The computer-implemented method of calculating automobile insurance of claim 1, wherein said location system includes at least one of a global positioning satellite receiver to determine location and a geographical database configured to be resident on said computation device.

5. The computer-implemented method of calculating automobile insurance of claim 1, wherein said pricing database at least includes actuarial statistics.

6. The computer-implemented method of calculating automobile insurance of claim 1, wherein said providing access with said computing device for the customer to said first cost increment includes providing access with at least one of an internet web site interface, a phone interface, a customer service interface, and combinations thereof.

7. The computer-implemented method of calculating automobile insurance of claim 1, wherein transmitting said first cost increment includes at least one of establishing a cellular phone connection, establishing a radio connection, establishing microwave communication, establishing a phone connection, establishing an internet connection, and combinations thereof.

8. A vehicle insurance computation apparatus that is installed in a vehicle and communicates with a contracting company that is remote to the vehicle and provides billing to a customer, the vehicle insurance computation apparatus comprising:

a computation device that acquires location information of the vehicle, acquires vehicle performance information from the vehicle and derives a first cost increment by evaluating at least said location information, said performance information and a pricing database; and a transmitting device that sends said first cost increment to the contracting company, wherein said first cost increment is devoid of said location information and said vehicle performance information, wherein access to said performance information and said location information of the vehicle is restricted by at least encrypting said location information and said vehicle performance information, wherein access is granted by at least decrypting said location information and said vehicle performance information with an access key, wherein said access key consists of a first passkey retained by the customer and a second passkey retained by the contracting company, wherein said computation device is configured to provide access for the customer outside of the vehicle to said first cost increment prior to the billing of the customer by contracting company, wherein said access for the customer outside of the vehicle to said first cost increment is adapted to permit the customer to alter driving habits to adjust a second cost increment;

wherein said transmitting device sends said second cost increment to the contracting company, wherein said second cost increment is devoid of said location information and said vehicle performance information, and wherein said sending of said second cost increment to the contracting company permits the contracting company to prepare the billing for the customer based on at least said first and said second cost increments.

9. The apparatus of claim 8, wherein said location information of the vehicle includes at least one of a geographical location of the vehicle, a duration of time the vehicle is located at said geographical location, a vehicle speed, an applicable speed limit, and combinations thereof.

10. The apparatus of claim 8, wherein said performance information of the vehicle includes at least one of a vehicle speed, a vehicle acceleration rate, a vehicle deceleration rate, a vehicle maintenance status, an engine speed, a brake force, a vehicle payload, and combinations thereof.

11. The apparatus of claim 8, wherein said computation device includes at least one of a global positioning satellite receiver to determine location and a geographical database configured to be resident on said computation device.

12. The apparatus of claim 11, wherein said pricing database at least includes actuarial statistics.

13. The apparatus of claim 8, wherein said computation device is configured to provide access for the customer outside of the vehicle through at least one of an internet web site interface, a phone interface, a customer service interface, and combinations thereof.

14. The apparatus of claim 8, wherein said transmitting device includes at least one of a cellular phone connection, a radio connection, microwave communication, a phone connection, an internet connection, and combinations thereof.

15. A computer-implemented method of determining a cost of insuring a motor vehicle, comprising:

using a monitoring apparatus located on-board the motor vehicle to at least assist in monitoring an operational factor associated with the vehicle in real time;

recording information with a computation device relating to said operational factor;

determining a first incremental insurance cost with said computation device using said recorded information for the motor vehicle related to a given incremental time period;

transmitting said first incremental insurance cost to the contracting company with said billing transmission system, wherein said first incremental insurance cost is devoid of said location information and said operational factor;

restricting access to said operational factor and said vehicle performance information with said billing transmission system by at least encrypting said operational factor;

accessing said operational factor and said billing transmission system by at least decrypting said operational factor with an access key, wherein said access key consists of a first passkey retained by the customer and a second passkey retained by a contracting company;

providing access with a computing device for the customer outside of the vehicle to said first incremental insurance cost prior to the contracting company billing the customer, wherein said providing access to said first incremental insurance cost is adapted to permit the customer to alter driving habits to adjust a second incremental insurance cost;

transmitting said second incremental insurance cost with said billing transmission system to the contracting company, wherein said second incremental insurance cost is devoid of operational factor; and determining billing for the customer from the contracting company based on at least said first and said second incremental insurance costs from said billing transmission system.

16. The computer-implemented method of claim 15, further comprising determining a value for insuring the motor vehicle based on said first and said second incremental insurance costs for said given incremental time period from said billing transmission system.

17. The computer-implemented method of claim 15, wherein determining said first incremental insurance cost comprises using a cost calculation system and a cost lookup database on the motor vehicle having actuarial information, in addition to said operational factor.

18. The computer-implemented method of claim 15, wherein monitoring said operational factor with said computation device of the motor vehicle comprises monitoring at least one of: -a speed of the motor vehicle; a geographic location of said motor vehicle; an acceleration of the motor vehicle; and a deceleration of the motor.

19. The computer-implemented method of claim 18, further comprising using an external location identification system for assisting in determining said geographic location of the motor vehicle.

* * * * *